United States Patent [19]

Ito

[11] Patent Number: 4,827,201
[45] Date of Patent: May 2, 1989

[54] DIGITAL SERVO SYSTEM FOR MOTOR DRIVEN APPARATUS

[75] Inventor: Kenji Ito, Fukaya, Japan

[73] Assignee: Kabushiki Kaisha Toshiba, Kanagawa, Japan

[21] Appl. No.: 103,016

[22] Filed: Sep. 30, 1987

[30] Foreign Application Priority Data

Sep. 30, 1986 [JP]  Japan ................................ 61-231719

[51] Int. Cl.⁴ ............................................. G05B 11/13
[52] U.S. Cl. .................... 318/603; 318/606; 360/73.04; 388/912; 388/903; 388/915
[58] Field of Search ........................ 318/603, 595, 314; 360/73

[56] References Cited

U.S. PATENT DOCUMENTS

| | | | |
|---|---|---|---|
| 4,243,921 | 1/1981 | Tamura ................................ | 318/314 |
| 4,656,537 | 4/1987 | Tobs et al. ............................ | 360/73 |
| 4,698,703 | 10/1987 | Nishimura et al. ................... | 360/73 |

*Primary Examiner*—William M. Shoop, Jr.
*Assistant Examiner*—Saul M. Bergmann
*Attorney, Agent, or Firm*—Finnegan, Henderson, Farabow, Garrett & Dunner

[57] ABSTRACT

A digital servo system comprising source means of a clock signal, counter means, latch means which latches a predetermined lower bits of the output of the counter means, means for obtaining a servo control output in response to the latch means, and sequencer means which is applied with a digital data of which the pulse interval or the phase is processed, and controls passing or nonpassing of the clock signal to the counter means in response to the digital data and obtains a latch pulse for the latch device. The servo system is characterized by that the servo system further comprises a circuit for stopping the input of the clock signal to the counter by controlling the counter when the digital data is applied, a latch circuit for latching a most significant bit of the predetermined lower bits, a sequencer for shifting a specified bits of the count data of the counter, and a linear range identifying circuit for identifying the upper limit and lower limit of the servo control output and the linear range between them using the output of the latch circuit for the most significant bit and the shifted specified bit output of the counter.

4 Claims, 17 Drawing Sheets

DIGITAL SERVO SYSTEM FOR MOTOR DRIVEN APPARATUS

FIELD OF THE INVENTION

The present invention relates generally to a digital servo system, and more particularly, to a digital servo system for a motor driven apparatus such as a video tape recorder.

BACKGROUND OF THE INVENTION

A digital servo system is highly effective for a motor driven apparatus such as a video tape recorder (referred to as a VTR hereafter), which demands a high degree of precision and stabilization for various motor speeds.

FIG. 1 shows the construction of a conventional digital frequency discriminator of a digital servo system used, for example, in VTRs. In FIG. 1, a clock signal CK is applied to a sequencer 20 and an AND gate 21 through a clock input terminal 22. The sequencer 20 and the AND gate 21 constitute a system control section of this digital frequency discriminator, as described later. The sequencer 20 also is applied through a data input terminal 23 with a digital data FG which is to be processed in this digital frequency discriminator. The digital data FG is generated by a rotation speed detector (not shown) for a capstan motor of VTRs. The sequencer 20 is so designed as to generate various control signal, such as a stop signal STOP, a latch signal LATCH and a preset signal PRESET, as shown in FIG. 2, in response to every pulse of the digital data FG. Those signals STOP, LATCH and PRESET are generated at times, as shown in FIG. 2, in synchronization with the clock signal CK.

The construction and the operation of the conventional digital frequency discriminator will be explained in reference to FIGS. 1 and 2. The stop signal STOP generated by sequencer 20 is applied to the AND gate 21. Then, the stop signal STOP prohibits the clock signal CK to transmit therethrough when the stop signal STOP is a low level (referred as the L level hereafter). Otherwise the clock signal CK is applied to a presettable up-counter 24 (hereafter referred to as 'up-counter'). The latch signal LATCH generated by sequencer 20 is applied to the latch input terminals of latch circuits 25 and 26 at a prescribed time after the operation of the up-counter 24 has been stabilized, for instance after five pulses of the clock signal CK have been applied. When the latch signal LATCH is applied, the latch circuit 25 latches L bits from the LSB (Least Significant Bit) of the count data of the up-counter 24. On the other hand, the latch circuit 26 latches a linear range indication signal F and a carry indication signal G, which will be described later. Those signals F and G are decoded by a decoder 27 from M bits from the MSB (Most Significant Bit) of the count data of the up-counter 24. After those latch operations have been completed in the latches 25 and 26, the preset signal PRESET generated by the sequencer 20 is applied to the preset terminal of the up-counter 24. As a result, a predetermined data NP stored in a ROM (Read Only Memory) 28 is preset in the up-counter 24.

After the preset of the data NP into the up-counter 24, the stop signal STOP turns to a high level (referred as the H level hereafter) so that the AND gate 21 allows the clock signal CK to transmit therethrough. The up-counter 24 begins its count operation and counts up from the value of the data NP preset as an initial value.

Decoder 27 judges the content of the M bits of the count data of the up-counter 24. When the M bits are all "1", the decoder 27 generates the linear range indication signal F. The signal F indicates that the operation of this digital frequency discriminator is in a linear detection characteristic range. Moreover, the decoder 27 detects an over-flow condition of the count operation in the up-counter 24 so that the carry indication signal G is generated. The operation of the decoder 27 will be explained below in more detail, in reference to FIG. 3.

As shown in FIG. 3, the up-counter 24 begins its count operation and counts up from the value of the data NP preset as the initial value, as described before, when a pulse FG1 of the digital data FG is applied. A saw-tooth waveform graph CNTa, shown by a solid line in the drawing, shows the variation of the count data in the up-counter 24. Now, it is assumed that the M bits applied to decoder 27 are three bits, the content of the L bits applied to the latch circuit 25 changes three times repeatedly until the M bits become all "1", as shown by another saw-tooth waveform graph CNTb with a broken line in the drawing.

Here, it is also assumed that a second pulse FG2 of the digital data FG appears at the position of the time axis, as shown by the dotted line in the drawing. Then, the L bits with approximately a value of the graph CNTb at a time t1, as shown in the drawing, is latched in the latch 25. Since the second pulse FG2 is in the linear range of the graph CNTb, an output data of the latch 25 is applied to an external circuit (not shown), e.g., a pulse width modulation circuit. The output of the latch 25 is used for controlling a pulse width modulation processing circuit (not shown). An output of the pulse width modulation circuit is used as a rotation speed control voltage for controlling the capstan motor driving circuit after being smoothed by a low-pass filter (not shown).

An output of the latch circuit 26 indicates whether or not the output of the digital frequency discriminator, i.e., the output of the latch 25 is in the linear range of the graph CNTb. If the signals F and G are both low level (referred to as the L level hereafter), the signals F and G indicate that the output of the digital frequency discriminator is lower than the lower limit of the linear detection characteristic range. If the signal F is H level and signal G is L level, the signals F and G indicate that the output of the digital frequency discriminator is in the linear detection characteristic range. If the signal F is L level and the signal G is H level, the signals F and G indicate that the output of the digital frequency discriminator is higher than the upper limit of the linear detection characteristic range.

Therefore, the signals F and G obtained by the latch circuit 26 are used to determine whether or not the output of the latch circuit 25, i.e., the frequency discrimination output of this digital frequency discriminator can be adopted for a servo control of the capstan motor (not shown). The above descriptions can be concluded, as shown in the following table.

| F | G | Detection Characteristic |
|---|---|---|
| 0 | 0 | 0 (Lower than Lower limit) |
| 1 | 0 | Within Linear Range |
| 0 | 1 | 1 (Higher than Upper limit) |

The preset value NP is set so that the center of the linear range ($2^M/2$) is obtained when the digital data FG with a center frequency fO is applied. More specifically, if the frequency of the clock signal CK is fck, the following equation is obtained.

$$fck/fO = 2^N - 2^{M-1} - NP + NS,$$

Therefore, the preset value NP is obtained as follows, $$NP = 2^N - 2^{M-1} + NS - fck/fO$$

Here, NS is the number of stops of the clock signals CK in one sequence period of the sequencer 20.

FIG. 4 shows an example of the construction of a conventional digital phase comparator of a digital servo system used, for example, in VTRs. In FIG. 4, clock signal CK is applied to a sequencer 30 and an AND gate 31, through a clock input terminal 32. The sequencer 30 and the AND gate 31 constitute a system control section of this digital phase comparator, as described later. The sequencer 30 also is supplied through a data input terminal 33 with a digital data COM which is to be processed in this digital phase comparator. The digital data COM is generated by a detector (not shown) for detecting a control signal recorded on video tapes.

The sequencer 30 is so designed as to generate various control signals, such as a stop signal STOP and a latch signal LATCH, as shown in FIG. 5, in response to every pulse of the digital data COM. Those signals STOP and LATCH are generated at times, as shown in FIG. 5, in synchronization with the clock signal CK.

The construction and the operation of the conventional digital phase comparator will be explained with reference to FIGS. 4 and 5. The stop signal STOP generated by sequencer 30 is applied to the AND gate 31. Then, the stop signal STOP prohibits the clock signal CK from transmitting therethrough when the stop signal STOP is at the L level. Otherwise the clock signal CK is applied to an up-counter 34. The latch signal LATCH generated by sequencer 30 is applied to the latch input terminals of latch circuit 35 at a prescribed time after the operation of the up-counter 34 has been stabilized, for instance after five pulses of the clock signal CK have been applied. When the latch signal LATCH is applied, the latch circuit 35 latches the count data of the up-counter 34.

When the latch operation has been completed in the latch 35, the stop signal STOP becomes the H level again so that the AND gate 31 allows the clock signal CK to transmit therethrough and to be applied to the up-counter 34.

A reference signal REF is applied to a reset terminal of the up-counter 34. The reference signal REF has a rectangular waveform which is set so as to have a duty ratio, as shown in FIG. 6. When the up-counter 34 is in the L level or "0" period, the up-counter 34 is forcibly reset. In this period, a count data of the up-counter 34 is maintained at "0". When the reference signal REF becomes the H level or "1", the up-counter 34 is released from the reset condition and begins its count operation.

The up-counter 34 continues the counting of pulses of the clock signal CK until all bits of the count data become "1". The all "1" bits state of the count data is detected by an all "1" detector 36. When the all "1" detector 36 has detected the all "1" bits state, the all "1" detector 36 generates a detection output and applies the detection output to the AND gate 31 via an inverter 37. The AND gate 31 thus prohibits the clock signal CK from being applied to the up-counter 34. During the time the clock signal CK is prohibited, the up-counter 34 holds the count data of the all "1" bits state. The all "1" bits holding state continues until the up-counter 34 is forcibly reset by the reference signal REF becoming the L level.

FIG. 6 shows a series of the above operations carried out in this phase comparator, as shown in FIG. 5. By the series of operations, the count data of the up-counter 34 varies in synchronization with the reference signal REF, as shown in the drawing by a graph CNT with a trapezoidal waveform.

In the conventional phase comparator, as shown in FIG. 6, the sequencer 30 is designed to generate the latch signal LATCH, when the digital data COM arises in correspondence with the slope section of the trapezoidal waveform of the count data CNT. The latch circuit 35 then latches the count data of the up-counter 34 at the time corresponding to the prescribed portion of the scope section. As a result, the phase difference between the digital data COM and the reference signal REF is detected by the phase comparator as the latch data of the latch circuit 35. The latch data of the latch circuit 35 is applied to an external circuit (not shown), e.g., a pulse width modulation circuit. The latch data then is used for controlling a pulse width modulation processing circuit (not shown) in a manner similar to the use of the detection output of the conventional frequency discriminator, as shown in FIG. 1. An output of the pulse width modulation circuit is used as a rotation speed control voltage for controlling the capstan motor driving circuit after being smoothed by a low-pass filter (not shown).

In the above circuit, in order to obtain a zero phase difference between the reference signal REF and the digital data COM, (i.e., a zero phase comparison output of the phase comparator) at approximately the center (at $2^{N-1}$ when the number of counter bits is taken as 2) of the slope of the trapezoidal waveform, it is possible to make the reference signal REF the H level at a phase in which the reference signal REF advances the digital data COM by $2^{N-1}$.

FIG. 7 shows an example of a VTR capstan servo system comprised of the conventional digital frequency discriminator and phase comparator, as shown in FIGS. 1 and 4. For instance, a VHS system VTR is subjected to three recording speed modes of SP, LP and EP. Further the VHS system VTR is required at control a capstan motor to a various speed for a fast reproduction mode. In the N times fast reproduction mode, the digital data FG and COM have their frequencies divided by N through dividers 40 and 41 before supplying them into the frequency discriminator 42 and the phase comparator 43. The outputs of the frequency discriminator 42 and the phase comparator 43 are supplied, as an AFC (Automatic Frequency Control) voltage and an APC (Automatic Phase Control) voltage, to a gain adjustment amplifier 44 via filters 45 and 46. The gain adjustment amplifier 44 combines the frequency discrimination output and the phase comparison output together and adjusts the gain of the combined signal. The filters 45 and 46 remove ripple components of the frequency discrimination output and the phase comparison output, respectively.

The gain of the combined signal, i.e., the output of the VTR capstan servo system is reduced in the N times fast speed reproduction mode. The gain adjustment amplifier 44 is switched so that its gain is set to N times. Thereby, the loop gain of the VTR capstan servo system can provide the gain necessary to carry out a correct servo control. The output obtained by the gain adjustment amplifier 44 is supplied to a control transistor 47 of a servo motor 48 such as a capstan motor for driving a video tape 49 via a power amplifier 50.

The conventional capstan servo system for VTRs, as shown in FIG. 7, has problems when it is made in an IC (Integrated Circuit). It is possible to make into an IC the portion of the circuit of the conventional capstan servo system for VTRs shown by the diagonal shading in FIG. 7 the power amplifier 50 are coupled to the IC circuit. Therefore, the IC requires a lot of pins P1 through P5 for the connections to the external circuits of the filters 45 and 46 and the power amplifier 50. Further, the conventional capstan servo system requires the gain adjustment, as described above. Therefore, the IC configuration of the conventional capstan servo system requires an analog switch for changing the loop gain in response to the reproduction speed mode. The analog switch is also located in the external circuit of the IC.

According to the reasons, as described above, the conventional capstan servo system also has a problem that the IC circuit becomes large in chip size.

SUMMARY OF THE INVENTION

Accordingly, an object of the present invention is to provide a digital servo system which can reduce the number of connection pins in IC configuration.

Another object of the present invention is to provide a digital servo system which can reduce the size of the IC chip.

A further object of the present invention is to provide a digital servo system which can automatically adjust a loop gain.

In order to achieve the above objects, the servo system of this invention includes a clock signal source, a counter, a latch circuit which latches predetermined lower bits of the output of the counter, a circuit for obtaining a servo control output in response to the latch circuit, and a sequencer which is supplied with a digital data of which the pulse interval or the phase is processed, and controls the passing or nonpassing of the clock signal to the counter in response to the digital data and obtains a latch pulse for the latch circuit, a circuit for stopping the input of the clock signal to the counter by controlling the counter when the digital data is applied, a latch circuit for latching a most significant bit of the predetermined lower bits, a sequencer for shifting specified bits of the count data of the counter, and a linear range identifying circuit for identifying the upper limit and lower limit of the servo control output and the linear range between them using the output of the latch circuit for the most significant bit and the shifted specified bit output of the counter.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
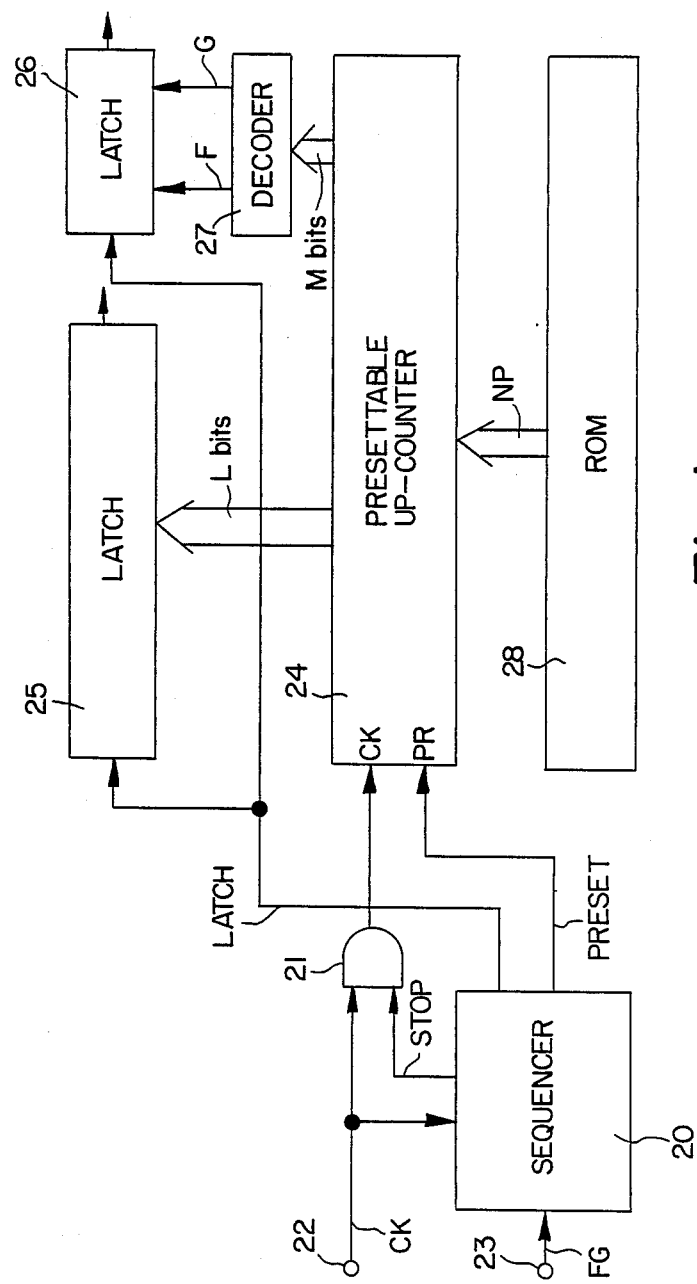
FIG. 1 is a schematic block diagram showing a conventional digital frequency discrimination circuit.
Figure 2:
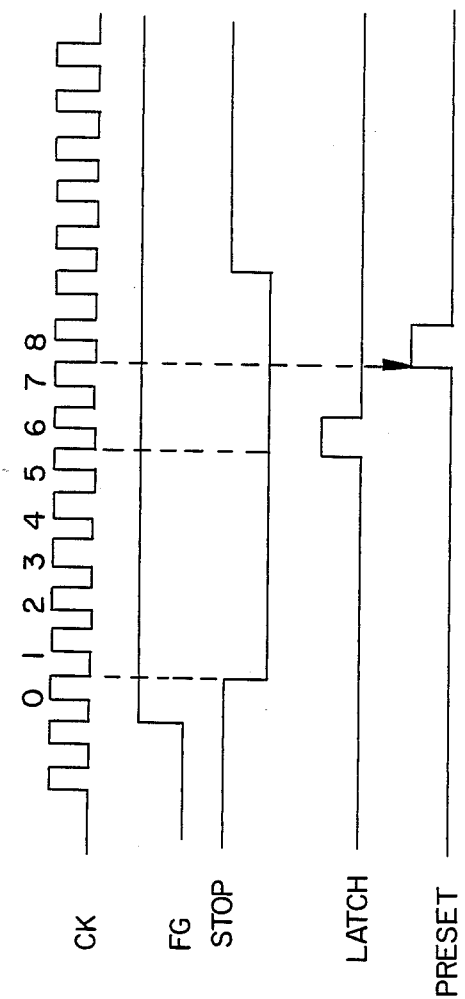
FIGS. 2 and 3 are timechart diagrams to illustrate the operation of the circuit in FIG. 1.
Figure 3:
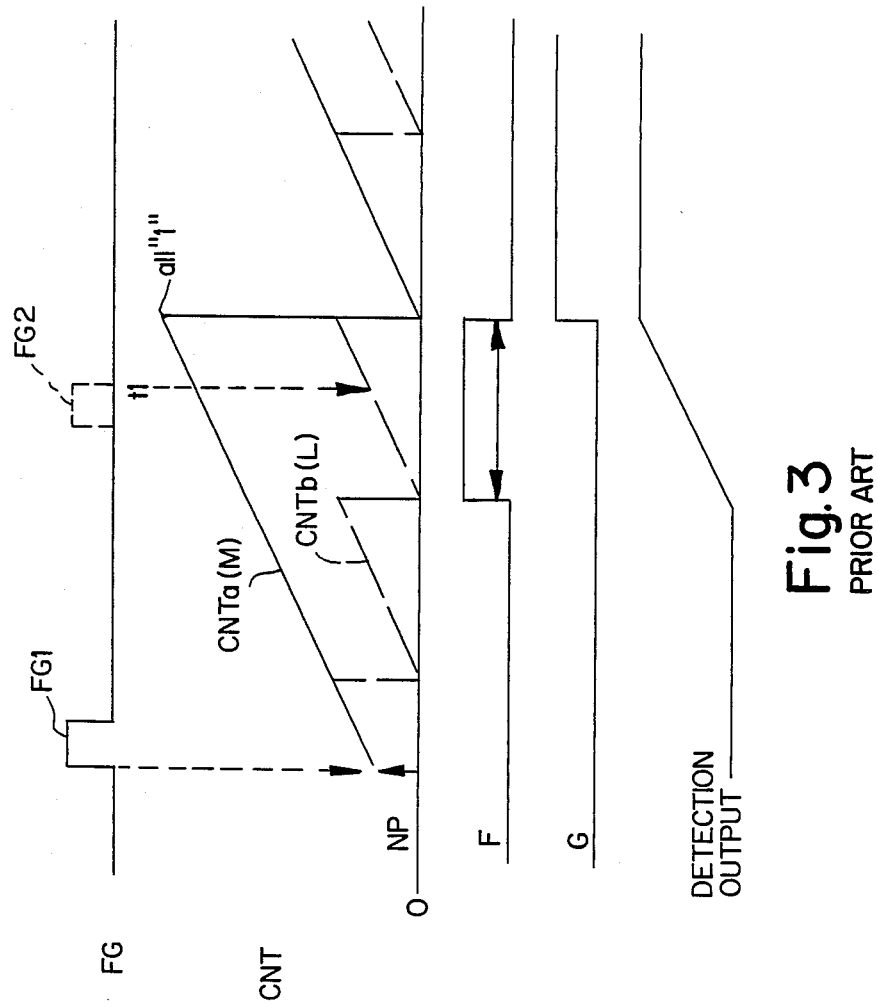
Figure 4:
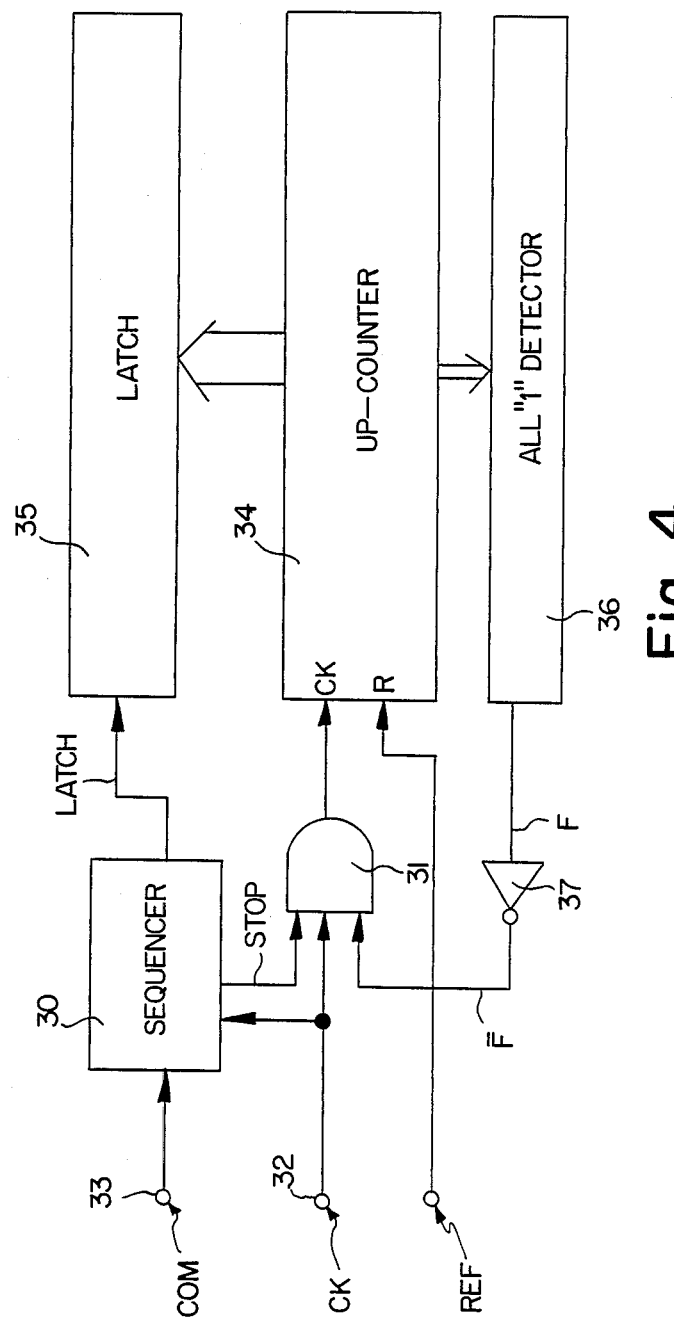
FIG. 4 is a schematic block diagram showing a conventional phase comparator.
Figure 5:
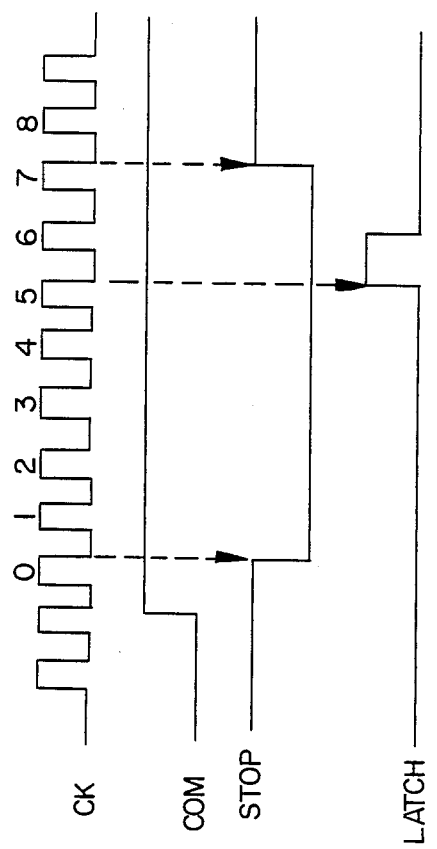
FIGS. 5 and 6 are timechart diagrams to illustrate the operation of the circuit in FIG. 4.
Figure 6:
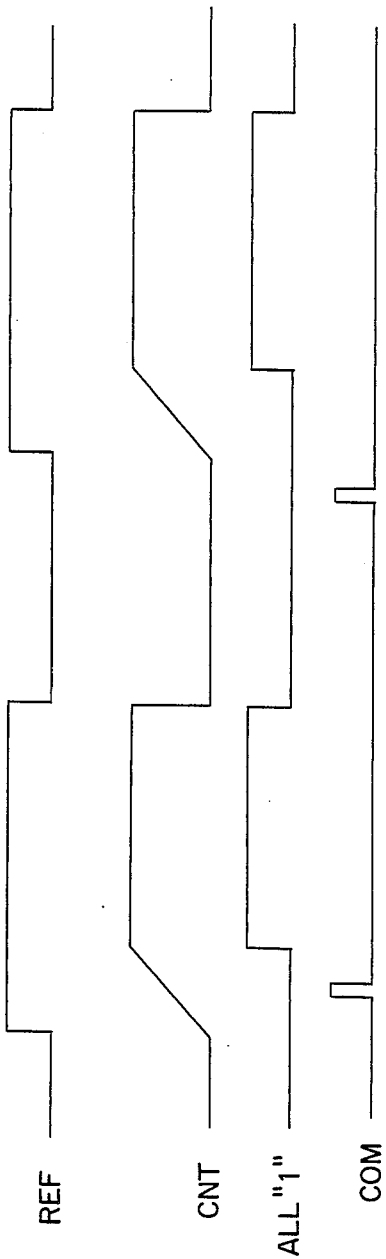
Figure 7:
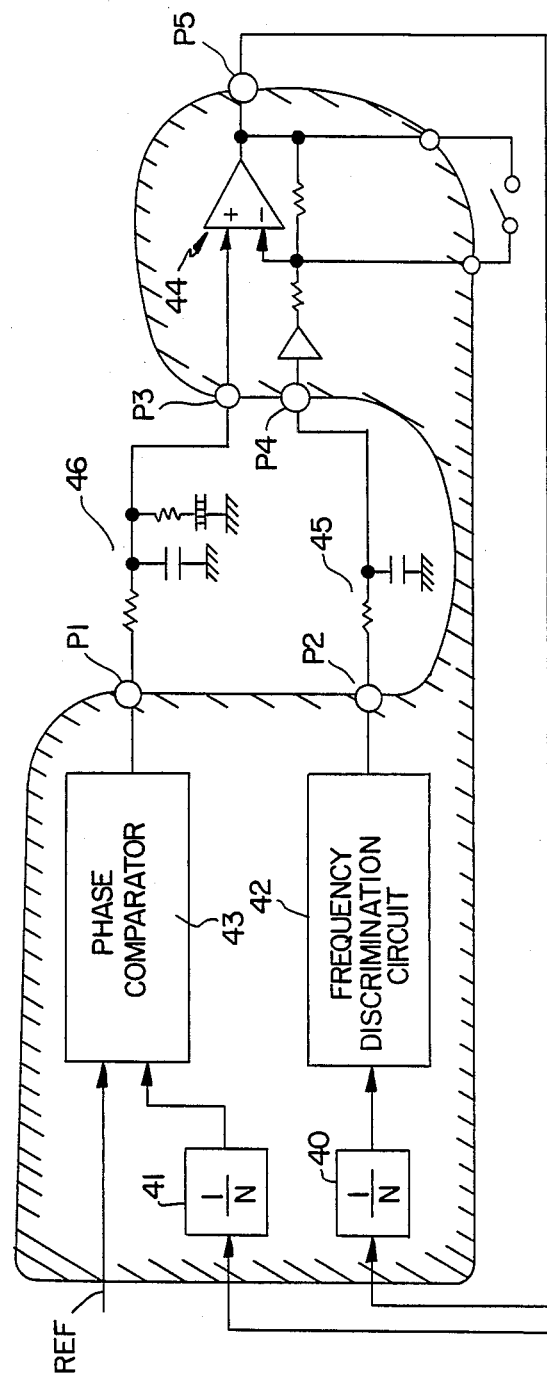
FIG. 7 is a schematic block diagram showing a servo system for a capstan motor in VTRs comprised of the conventional digital frequency discrimination circuit and phase comparator of FIGS. 1 and 4.

The present invention will be described in detail with reference to the FIGS. 8 to 17. Throughout the drawings, reference numerals or letters used in FIGS. 1 through 7 will be used to designate like or equivalent elements for simplicity of explanation.

Figure 8:
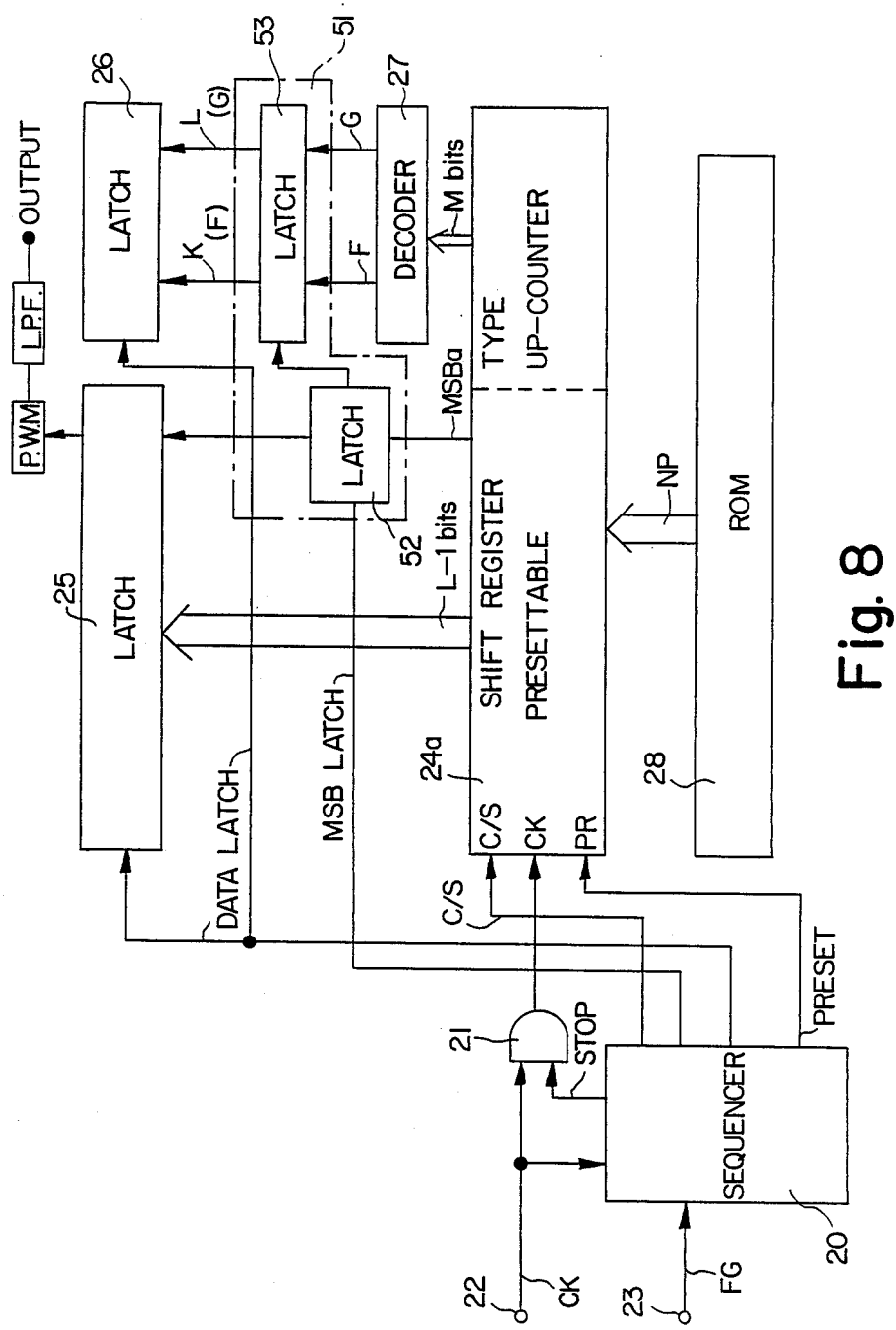
FIG. 8 is a schematic block diagram showing an embodiment of a digital frequency discrimination circuit according to the present invention.

Referring now to FIG. 8, an embodiment of the digital servo system, in particular to a digital frequency discrimination circuit according to the present invention will be described in detail. In FIG. 8, parts which are not relevant to the control of the apparatus are omitted from the illustration.

FIG. 8 is an embodiment of a digital frequency discrimination circuit used for servo system for a motor driven apparatus such as a capstan motor of VTRs. A digital data FG and a clock signal CK are applied to a sequencer 20. The clock signal CK is also applied to one terminal of an AND gate 21. The sequencer 20 and the AND gate 21 constitute a control section for the frequency discrimination circuit.

Figure 9:
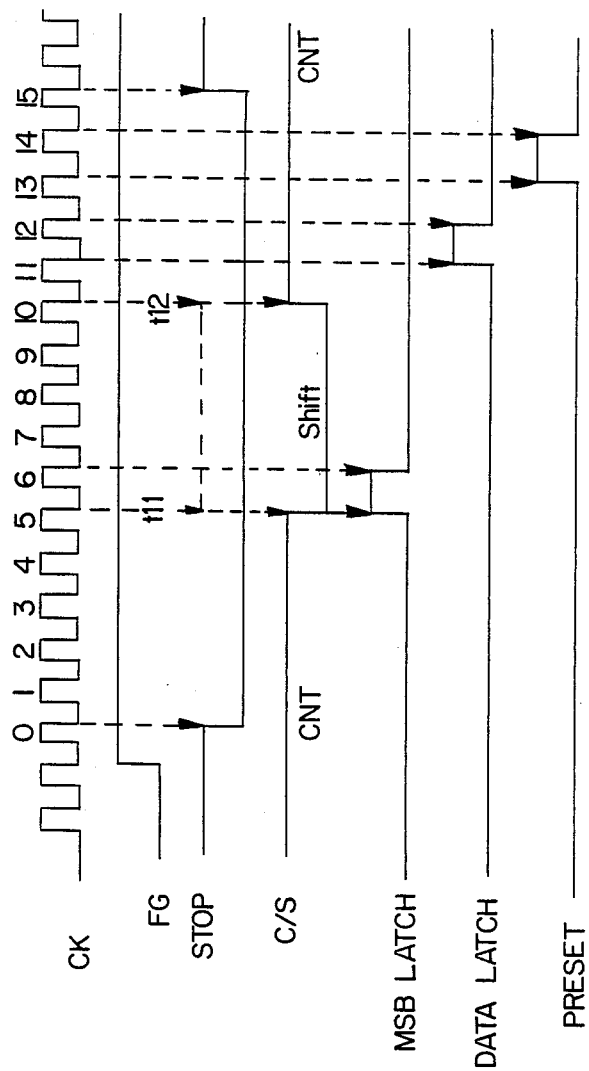
FIG. 9 is a timechart diagram to illustrate the operation of the circuit of FIG. 8.

The sequencer 20 is so designed as to generate various control signals, such as a stop signal STOP, a preset signal PRESET, a function switch signal c/s, a data latch signal DATA LATCH and an MSB latch signal MSB LATCH, as shown in FIG. 9, in response to every pulse of the digital data FG. Those signals STOP, LATCH, PRESET, c/s, DATA LATCH and MSB LATCH are generated at times, as shown in FIG. 9, in synchronization with the clock signal CK.

Here, the embodiment of the digital frequency discriminator, as shown in FIG. 8, is different from the conventional digital frequency discriminator (see FIG. 1) as below. A shift register type presettable up-counter (referred simply as up-counter hereafter) 24e is changed in its function mode between a shift register mode and a presettable up-counter mode so that it can operate as a presettable up-counter and also as a shift register. The function mode switch signal c/s for controlling the function mode of the up-counter 24a is generated by the sequencer 20 at the time, as shown in FIG. 9, in synchronization with the clock signal CK. A linear range indication signal F and a carry indication signal decoded by a decoder 27 are applied to a latch circuit 26 through a linear range selection circuit 51 which will be described later. Further, the gain of the detection output of this digital frequency discriminator is changed in response to a reproduction speed mode, as described later. As a result, a desired linear range of the detection characteristics is changed.

The construction and the operation of the digital frequency discriminator according to the present invention will be explained in reference to FIGS. 8 and 9. The stop signal STOP generated by the sequencer 20 is applied to the AND gate 21. Then, the stop signal STOP prohibits the clock signal CK from transmitting therethrough when the stop signal STOP is at the L level. Otherwise, the clock signal CK is applied to the up-counter 24a when the clock signal CK is at the H level.

The up-counter 24a is changed to the shift register mode when the function mode switch signal c/s of the L level generated by the sequencer 20 is applied to the up-counter 24a at a prescribed time after the operation of the up-counter 24a has been stabilized, for instance, after a time corresponding to five pulses of the clock signal CK have elapsed. At the time, the sequencer 20 supplies the MSB latch signal MSB LATCH to a latch circuit 52 in the linear range selection circuit 51 so that the latch circuit 52 latches the most significant bit MSBa of L bits from the LSB of the count data of the up-counter 24a. Then, the sequencer 20 supplies the AND gate 21 with the stop signal STOP of the H level during a period between a time t11 and a time t12, as shown in FIG. 9, so that five pulses of the clock signal CK are applied to the up-counter 24.

The sequencer 20 then applies the latch circuits 25 and 26 with the data latch signal DATA LATCH. The latch circuit 25 latches L−1 bits from the LSB of the count data of the up-counter 26 in the shift register mode and the bit MSBa previously latched in the latch circuit 52 of the linear range selection circuit 51. The data latched in the latch circuit 25 is a frequency discrimination output of this frequency discrimination circuit, as shown in FIG. 8. The frequency discrimination output is used as the AFC signal for controlling servo systems.

Decoder 27 judges the content of the M bits of the count data of the up-counter 24a. When the M bits are all "1", the decoder 27 generates the linear range indication signal F. The signal F indicates that the operation of this digital frequency discriminator is in a linear detection characteristic range when the gain is not altered, as described later. Moreover, the decoder 27 detects an overflow condition of the count operation in the up-counter 24 so that the carry indication signal G is generated.

The linear range selection circuit 51 processes a linear range indication signal F and a carry indication signal G both decoded by the decoder 27 in using the bit MSBa latched in the latch circuit 52, as described later. Then, the linear range selection circuit 51 including latch 53 generates two output data K and L. The latch circuit 26 latches the output data K and L. The data K and L indicate either that the frequency discrimination output from the the latch circuit 25 is (a): in the linear detection characteristic range, (b): above the upper limit of the linear detection characteristic range, or (c): below the lower limit of the linear detection characteristic range. The linear range alters in response to whether the up-counter 24a operates with a bit shift or not.

Thus, the linear range selection circuit 51 selects a desired range of the linear detection characteristic range when the gain of the digital data FG has been altered. The gain alteration of the digital data FG occurs, e.g., when a rotation speed of a servo motor such as a capstan motor is changed in response to the normal or fast reproduction speed mode and or the SP, LP or EP recording speed mode.

Figure 10:
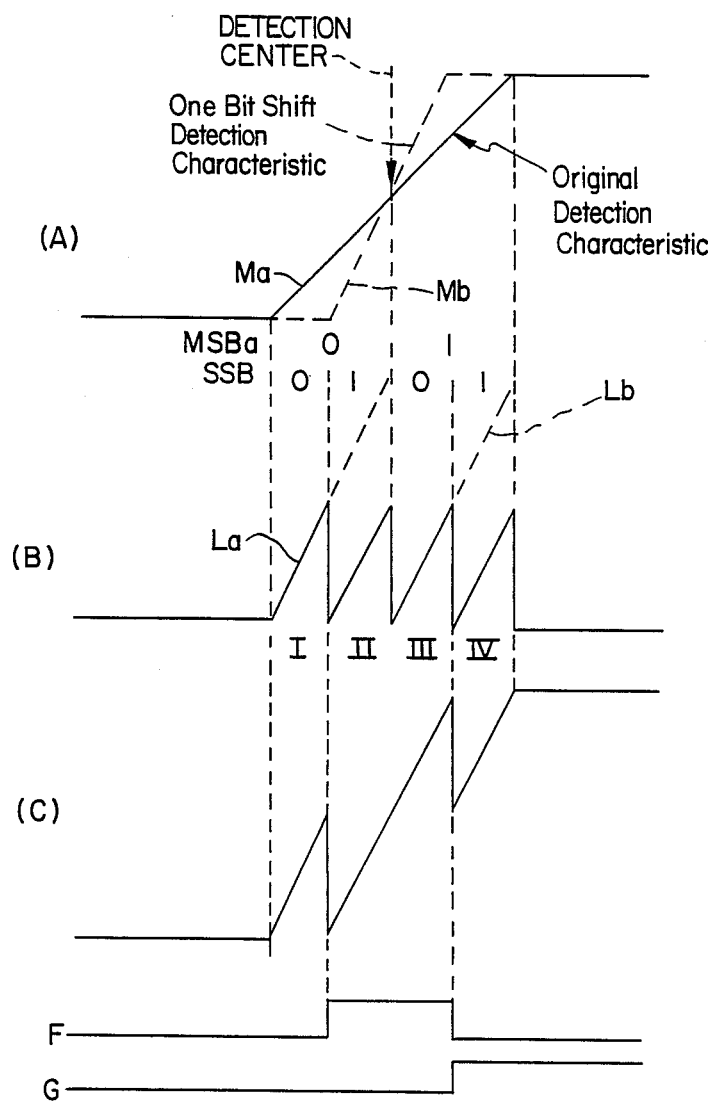
FIG. 10 is another timechart diagram to illustrate the operation of the circuit of FIG. 8.

Referring now to FIG. 10, the gain alteration of the frequency discrimination output is explained in more detail for a case that a count data of the up-counter 24a is shifted by a one bit shift. This causes a gain increase of 6 dB in the frequency discrimination output. The graph Ma with the solid line in FIG. 10(A) is the original detection characteristic in the case when the bit shift operation has not been carried out. The graph Mb with the broken line in FIG. 10(A) is the detection characteristic when the one bit shift operation has been carried out. The slope section of the graph Mb is twice as steep as the graph Ma. The detection characteristic, as shown by the graph Mb, is obtained as follows.

The graph Lb with the broken line in FIG. 10(B) shows the variation of the count data of the L bits of the up-counter 24a including the bit MSBa or the variation of the count data obtained by the one bit shift operation. The graph La with the solid line in FIG. 10(B) shows the variation of the count data of the L−1 bits of the up-counter 24a excluding the bit MSBa. The count data of the L−1 bits repeats twice (two cycles) the same content during which the bit MSBa varies from "0" to "1", as shown by the graph La. In other words, a second significant bit SSB of the L bits changes four times (four cycles) as "0", "1", "0", "1", during which the bit MSBa varies from "0" to "1".

Here, if the output data of the LSB to the SSB of the L bits is used when the bit MSBa="0" (zone II in the drawing), and the center value of the detection characteristic is added to the output data of the LSB to the SSB when the bit MSBa="1" (zone III in the drawing), the detection characteristic, as shown in FIG. 10(C), can be obtained.

Consequently, the section of the detection characteristic corresponding to the ones II and III can be selected as the desired linear range for, e.g., the frequency discrimination in the fast reproduction speed mode. On the other hand, the section corresponding to the zone IV and above is used for indicating a carry range, that is, the overflow state of the up-counter 24a.

Figure 11:
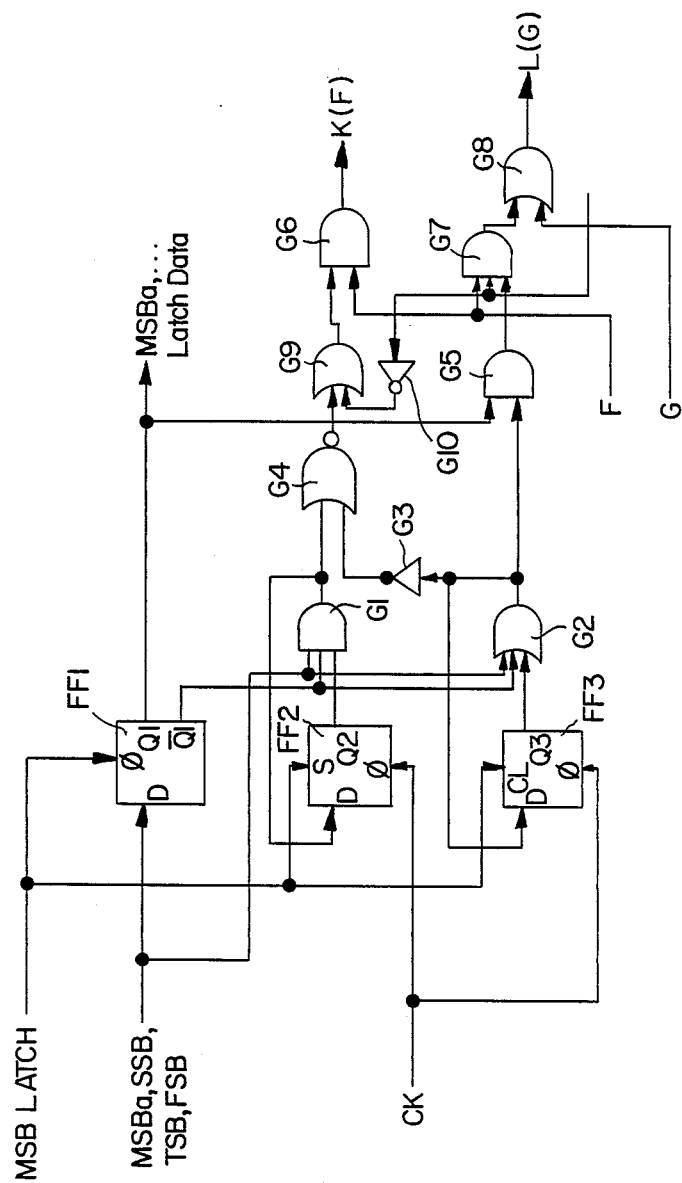
FIG. 11 is a schematic block diagram showing an embodiment of a digital phase comparator according to the present invention.
Figure 12:
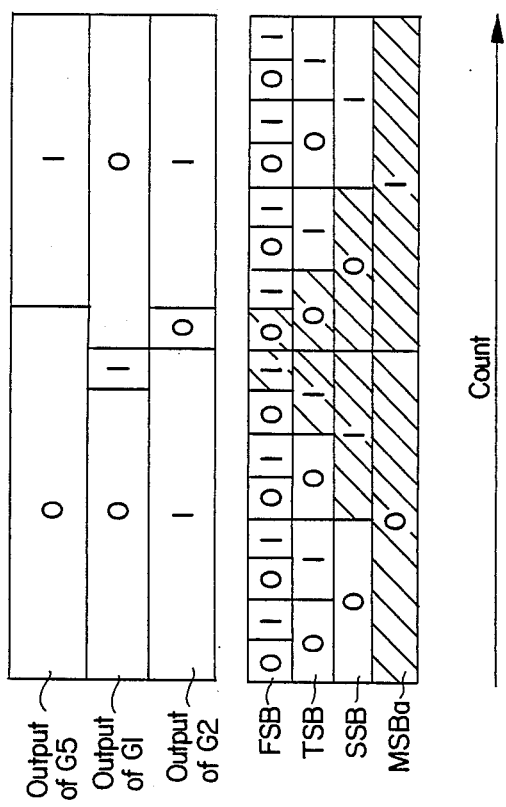
FIG. 12 is a schematic block diagram showing the operation of the decoder of FIG. 8.

Referring now to FIGS. 11 and 12, the construction and the operation of the linear range selection circuit 51 will be described. In the case of the one bit shift operation, as shown in FIG. 10, the selection for the linear ranges is made by identifying the cases in which the the MSBa="0" and the SSB="1" (zone II) and the MSBa="1" and the SSB="0" (zone III).

FIG. 12 shows a table for identifying the linear range in the case of a four bit shift operation. The linear range in the four bit shift operation may be made by identifying the cases, as shown by the diagonal shading zones in the table. That is to say, when the MSBa="0", the SSB="1" and two bits below the SSB, i.e., the third and fourth significant bits TSB and FSB are all "1", and when the MSBa="1", the bits SSB, TSB and FSB are all "0".

The linear range selection circuit 51, as shown in FIG. 11, carries out the operation of identifying the diagonal shading zones in the table of FIG. 12.

In FIG. 11, a flip-flop FF1 is provided for latching the bit MSBa. A flip-flop FF2 is set by the MSB latch signal MSB LATCH and takes a logical product between its own non-inverse output Q2 and the bit MSBa through an AND gate G1 as its data input. When the bit MSBa (actually, the bit SSB because the count data of the up-counter 24a is shifted by one bit at the time) is "0", the output of the AND gate G1 becomes "0". Then, the non-inverse output Q2 of the flip-flop FF2 becomes "0" when the next pulse of the clock signal CK is applied. When conversely the bit MSBa is "1" the output of the AND gate G1 becomes "1". Then, the non-inverse output Q2 of the flip-flop FF2 becomes "1" when the next pulse of the clock signal CK is applied.

As these shift operations progress, the bits MSBa, SSB, TSB and FSB are successively applied to one side of AND gate G1. As a result, the AND gate G1 successively takes a logical product between the output of the flip-flop FF2 and the bits MSBa, SSB, TSB and FSB. The operation of the AND gate G1 corresponds to the identification of the left section of the diagonal shading zones in the table of FIG. 12.

A flip-flop FF3 is cleared by the MSB latch signal MSB LATCH and takes a logical sum between its own non-inverse output Q3 and the bit MSBa through an OR gate G2 as its data input. The OR gate G2 successively takes the non-inverse output of the flipflop FF3 and the bits MSBa, SSB, TSB and FSB. The OR gate G2 thus detects the situation in which the bits SSB, TSB and FSB are all "0". When the situation has occured, the logical sum obtained by the OR gate G2 becomes "0".

An inverse logical sum between the output of the AND gate G1 and an output through an OR gate G2 and an inverter G3 is taken by a NOR gate G4. The output of the NOR gate G4 is used for identifying the linear detection range described above when the gain is altered. If the output of the NOR gate G4 is the "1" or H level, it is identified that the frequency discrimination circuit is in the linear detection range. The linear range indication signal F is used when the gain is not altered. The linear range indication signals K and F are applied to the latch circuit 26 (see FIG. 8) through an OR gate G9 and an AND gate G6.

A logical product between the output of the OR gate G2 and the non-inverse output Q1 of the flip-flop FF1 is taken by an AND gate G5. The output of the AND gate G5 is used for indicating the overflow condition of the up-counter 24a when the gain is altered. If the output of the NOR gate G4 is "1" or the H level, it is indicated that an overflow has occured in the up-counter 24a when the gain is altered. The carry indication signal G is used when the gain is not altered. The carry indication signals L and G are applied to the latch circuit 26 (see FIG. 8) through an AND gate G7 and an OR gate G8.

After those latch operations have been completed in the latch circuits 25 and 26, the preset signal PRESET generated by the sequencer 20 is applied to the preset terminal of the up-counter 24a. As a result, a predetermined data NP stored in a ROM 28 is preset in the up-counter 24a.

After the preset of the data NP into the up-counter 24a, the stop signal STOP turns to the H level so that the AND gate 21 allows the clock signal CK to transmit therethrough. The up-counter 24a begins its count operation and counts up from the value of the data NP preset as an initial value.

As described above, the frequency discrimination circuit according to the present invention, as shown in FIG. 8, can alter the detection characteristic in response to the gain of the digital data FG which is processed in the circuit. Incidentally, when trying to obtain an operation similar to conventional operation, this can easily be achieved by setting the switching of sequencer 20 so that the shift operation of the up-counter 24a is omitted.

Figure 13:
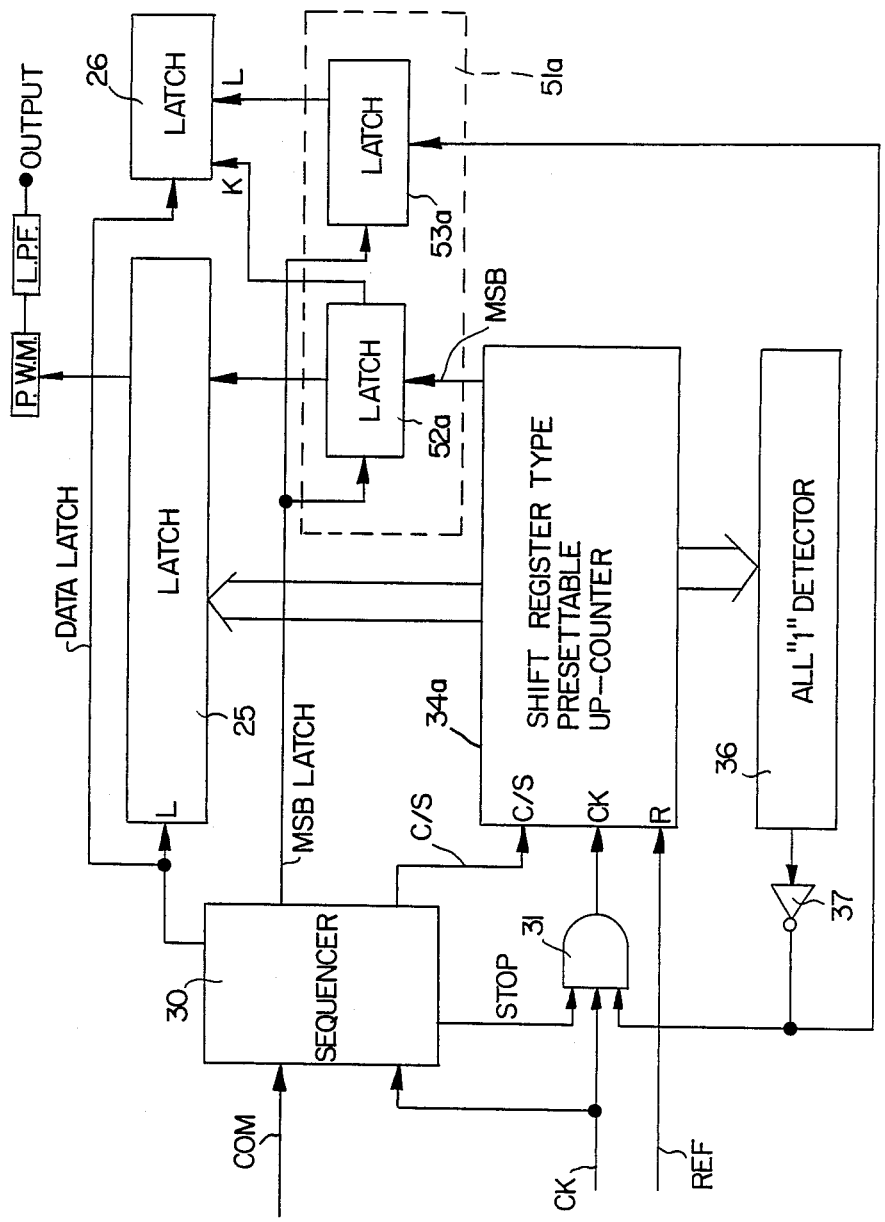
FIG. 13 is a schematic block diagram showing an embodiment of the digital phase comparator according to the present invention.

Referring now to FIG. 13, another embodiment of the digital servo system, in particular to a digital phase comparator according to the present invention will be described in detail. In FIG. 13, parts which are not relevant to the control of the apparatus are omitted from the illustration.

FIG. 13 is an embodiment of a digital phase comparator used for servo system for a motor driven apparatus such as a capstan motor of VTRs. A digital data COM and a clock signal CK are applied to a sequencer 30. The clock signal CK is also applied to one terminal of an AND gate 31. The sequencer 30 and the AND gate 31 constitute a control section for the phase comparator.

Figure 14:
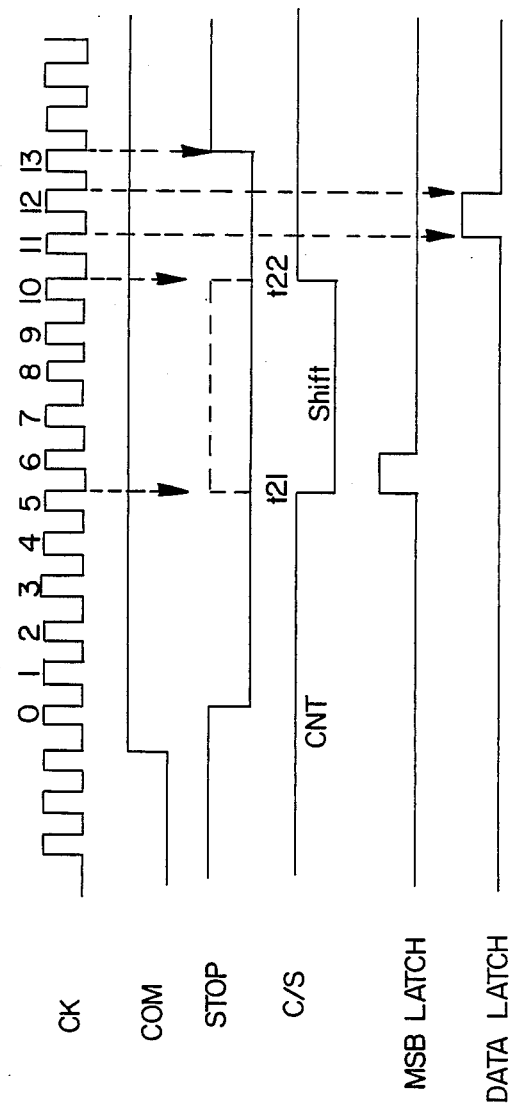
FIG. 14 is a timechart diagram to illustrate the operation of the circuit of FIG. 13.

The sequencer 30 is so designed as to generate various control signals, such as a stop signal STOP, a function switch signal c/s, a data latch signal DATA LATCH and an MSB latch signal MSB LATCH, as shown in FIG. 14, in response to every pulse of the digital data COM. Those signals STOP, LATCH, PRESET c/s, DATA LATCH and MSB LATCH are generated at times, as shown in FIG. 14, in synchronization with the clock signal CK.

Here, the embodiment of the digital phase comparator, as shown in FIG. 13, is different from the conventional digital phase comparator (see FIG. 4) as below. A shift register type presettable up-counter (referred simply as up-counter hereafter) 34a is changed in function mode between a shift register mode and a presettable up-counter mode so that it can operate as a presettable up-counter and also as a shift register. The function mode switch signal c/s for controlling the function mode of the up-counter 34a is generated by the sequencer 30 at the time, as shown in FIG. 14, in synchronization with the clock signal CK. A linear range indication signal Ka and a carry indication signal La decoded by a linear range selection circuit 51a will be described later and are indirectly applied to a latch circuit 26. Further, the gain of the detection output of this digital phase comparator is changed in response to a reproduction speed mode, as described later. As a result, a desired linear range of the detection characteristics is changed.

The construction and the operation of the digital phase comparator according to the present invention will be explained in reference to FIGS. 13 and 14. The stop signal STOP generated by the sequencer 30 is applied to the AND gate 31. Then, the stop signal STOP prohibits the clock signal CK from transmitting therethrough when the stop signal STOP is at the L level. Otherwise, the clock signal CK is applied to the up-counter 34a when the clock signal CK is the level.

The up-counter 34a is changed to the shift register mode when the function mode switch signal c/s of the L level generated by the sequencer 30 is applied to the up-counter 34a at a prescribed time after the operation of the up-counter 34a has been stabilized, for instance, after a time corresponding to five pulses of the clock signal CK have elapsed. At the time, the sequencer 30 applies the MSB latch signal MSB LATCH to a latch circuit 52a in the linear range selection circuit 51a so that the latch circuit 52a latches the most significant bit MSB of the count data of the up-counter 34a. Then, the sequencer 30 supplies the AND gate 31 with the stop signal STOP of the H level during a period between a time t21 and a time t22, as shown in FIG. 14, so that five pulses of the clock signal CK are applied to the up-counter 34a.

The sequencer 30 then supplies the latch circuits 25 and 26 with the data latch signal DATA LATCH. The latch circuit 25 latches N−1 bits of the N bit count data of the up-counter 34a excluding the MSB of the count data in the shift register mode and the bit MSB previously latched in the latch circuit 52a of the linear range selection circuit 51a. The date latched in the latch circuit 25 is the phase comparison output of this phase comparator, as shown in FIG. 13. The phase comparison output is used as the APC signal for controlling servo systems.

A reference signal REF is applied to a reset terminal of the up-counter 34a. The reference signal REF has a rectangular waveform which is so set as to have a duty ratio similar to FIG. 6. When the up-counter 34a is in the L level or "0" period, the up-counter 34a is forcibly reset. In this period, a count data of the up-counter 34a is maintained at "0". When the reference signal REF becomes the H level or "1", the up-counter 34a is released from the reset condition and begins its count operation.

The up-counter 34a continues the counting of pulses of the clock signal CK until all bits of the count data become "1". The all "1" bits state of the count data is detected by an all "1" detector 36. When the all "1" detector 36 has detected the all "1" bits state, the all "1" detector 36 generates a detection output and applies the AND gate 31 with the detection output via an inverter 37. The AND gate 31 thus prohibits the clock signal CK being applied to the up-counter 34a. During the clock signal CK being prohibited, the up-counter 34a holds the count data of the all "1" bits state. The all "1" bits holding state continues until the up-counter 34a is forcibly reset by the reference signal REF of the L level. When a next pulse of the digital data COM is applied to the up-counter 34a, the sequencer 30 carries out the sequence operation, as shown in FIG. 14. Then, the phase comparator, as shown in FIG. 13, carries out the phase comparison operation between the digital data COM and the reference signal REF. The phase comparison output is obtained from the latch circuit 25 as the APC signal.

The linear range selection circuit 51a decodes a linear range indication signal Ka and a carry indication signal La in using the bit MSB latched in the latch circuit 52a, as described later. The latch circuit 26 latches the indication signals Ka and La or signals K and L obtained from them. The linear range indication signal Ka indicates either that the phase comparison output from the the latch circuit 25 is (a): in the linear detection characteristic range, (b): above the upper limit of the linear detection characteristic range, or (c): below the lower limit of the linear detection characteristic range. The linear range alters in response to whether the up-counter 34a operates with a bit shift or not.

Thus, the linear range selection circuit 51a selects a desired range of the linear detection characteristic range when the gain of the digital data COM has altered. The gain alteration of the digital data COM occurs, e.g., when a rotation speed of a servo motor such as a capstan motor is changed in response to the normal or fast reproduction speed mode and or the SP, LP or EP recording speed mode.

Figure 15:
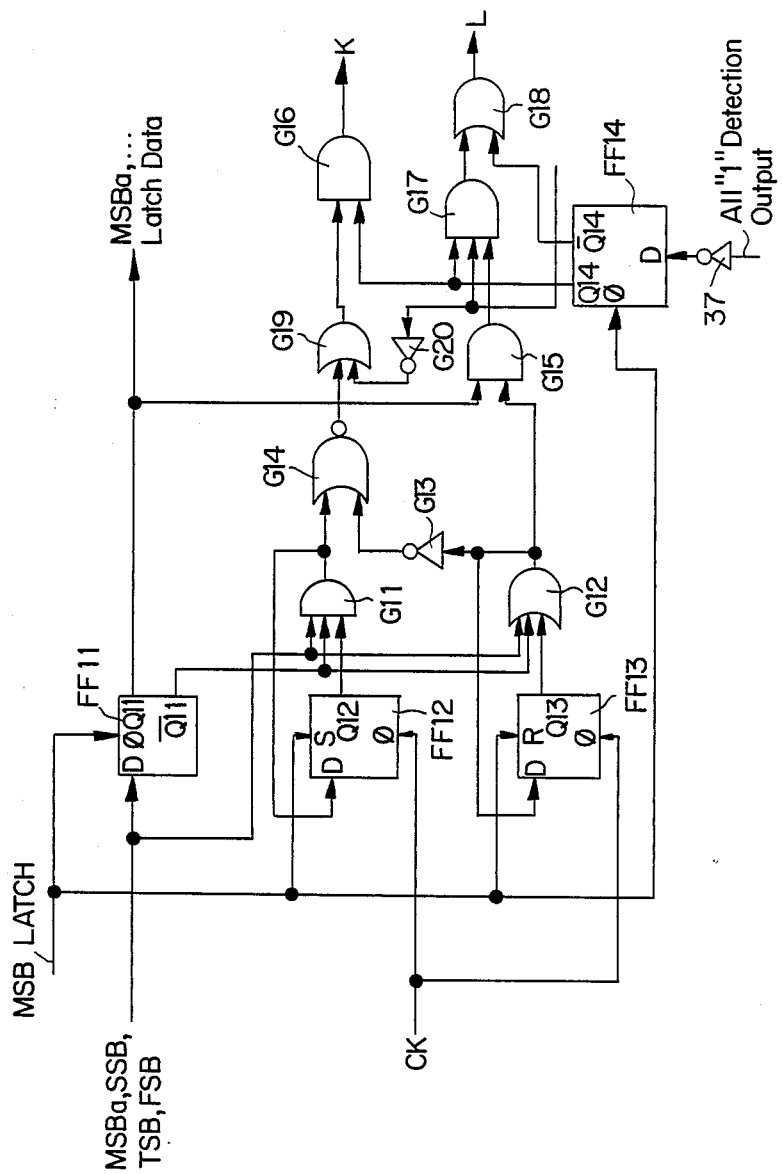
FIG. 15 is a schematic block diagram showing the decoder of FIG. 13.
Figure 16:
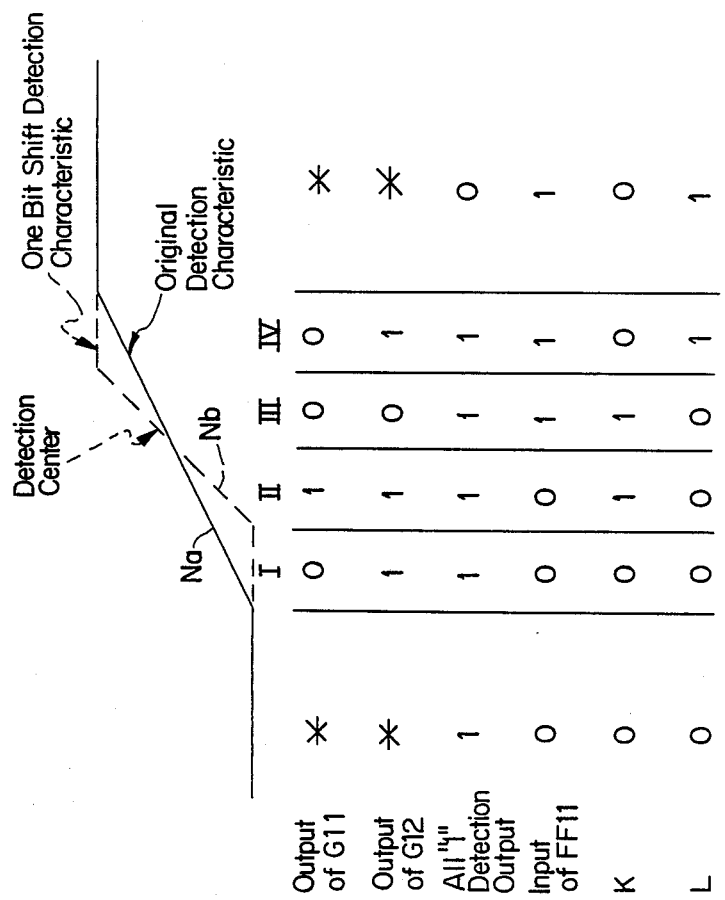
FIG. 16 is a diagram to illustrate the detection characteristics of the circuit of FIG. 15.

Referring now to FIGS. 15 and 16, the construction and the operation of the linear range selection circuit 51a will be described. In the case of the one bit shift operation, as shown in FIG. 15, the selection for the linear ranges is made by identifying the cases in which the the MSB="0" and the SSB="1" and the MSB="1" and the SSB="0". The cases correspond to the zones II and III, as shown in FIG. 16.

In FIG. 15, a flip-flop FF11 is provided for latching the bit MSB. A flip-flop FF12 is set by the MSB latch signal MSB LATCH and takes a logical product between its own non-inverse output Q12 and the bit MSB through an AND gate G11 as its data input. When the bit MSB (actually, the bit SSB because the count data of the up-counter 34a is shifted by one bit at the time) is "0", the output of the AND gate G11 becomes "0". Then, the non-inverse output Q12 of the flip-flop FF12 becomes "0" when the next pulse of the clock signal CK is applied. When conversely the bit MSB is "1", the output of the AND gate G1 becomes "1". Then, the non-inverse output Q12 of the flip-flop FF12 becomes "1" when the next pulse of the clock signal CK is applied.

As these shift operations progress, the bits MSB, SSB, TSB and FSB are successively applied to one side of AND gate G11. As a result, the AND gate G11 successively takes a logical product between the output of the flip-flop FF12 and the bits MSBa, SSB, TSB and FSB.

A flip-flop FF13 is cleared by the MSB latch signal MSB LATCH and takes a logical sum between its own non-inverse output Q13 and the bit MSBa through an OR gate G12 as its data input. The OR gate G12 successively takes the non-inverse output of the flipflop FF13 and the bits MSBa, SSB, TSB and FSB. The OR gate G12 thus detects the situation in which the bits SSB, TSB and FSB are all "0". When the situation has occured, the logical sum obtained by the OR gate G12 becomes "0".

An inverse logical sum between the output of the AND gate G11 and an output through an OR gate G12 and an inverter G13 is taken by a NOR gate G14. The output Ka of the NOR gate G14 is used for identifying the linear detection range described above when the gain is altered. If the output of the NOR gate G14 is "1" or the H level, it is identified that the phase comparator is in the linear detection range. On the other hand, the inverse output of the all "1" detector 36 (see FIG. 13) through the inverter 37 is applied to a flip-flop FF14 which functions as part of latch 53a of FIG. 13. The inverse output of the all "1" detector 36 is used when the gain is not altered. The non-inverse outpput of the flip-flop FF14 and the linear range indication signal ka obtained by the NOR gate G14 are applied to the latch circuit 26 through an OR gate G19 and an AND gate G16.

A logical product between the output of the OR gate G12 and the non-inverse output Q11 of the flip-flop FF11 is taken by an AND gate G15. The output La of the AND gate G15 is used for indicating the overflow condition of the up-counter 34a when the gain is altered. If the output of the NOR gate G14 is "1" or the H level, it is indicated that an overflow has occured in the up-counter 34a when the gain is altered. The inverse output of the all "1" detector 36 through the inverter 37 is applied to the flip-flop FF14. The inverse output of the all "1" detector 36 is used when the gain is not altered. The non-inverse output of the flip-flop FF14 and the linear range indication signal La obtained by the NOR gate G14 are applied to the latch circuit 26 through an OR gate G19 and an AND gate G16.

As described above, the phase comparator circuit according to the present invention, as shown in FIG. 13, can alter the detection characteristic in response to the gain of the digital data COM which is processed in the circuit. Incidentally, when trying to obtain an operation similar to conventional operation, this can easily be achieved by setting the switching of the sequencer 30 so that the shift operation of the up-counter 34a is omitted.

Although the operation of the linear range selection circuit 51a is identical with the linear range selection circuit 51 of the digital frequency discrimination circuit, as shown in FIG. 8, the linear range selection circuit 51a of the phase comparator uses the flip-flop FF14 for latching the inverted output from the all "1" detector 36 through the inverter 37 instead of the decoder 27.

FIG. 16 shows the variation of the detection characteristic when the up-counter 34a operates with one bit shift. The graph Nb shown by the broken line is the detection characteristic when the gain is altered. If the MSB, which is latched first, is "1", there is the possibility that the phase comparator is operating in the linear detection range. Further identification for the linear detection range is made by observing the outputs of the AND gate G11 and the OR gate G12.

Figure 17:
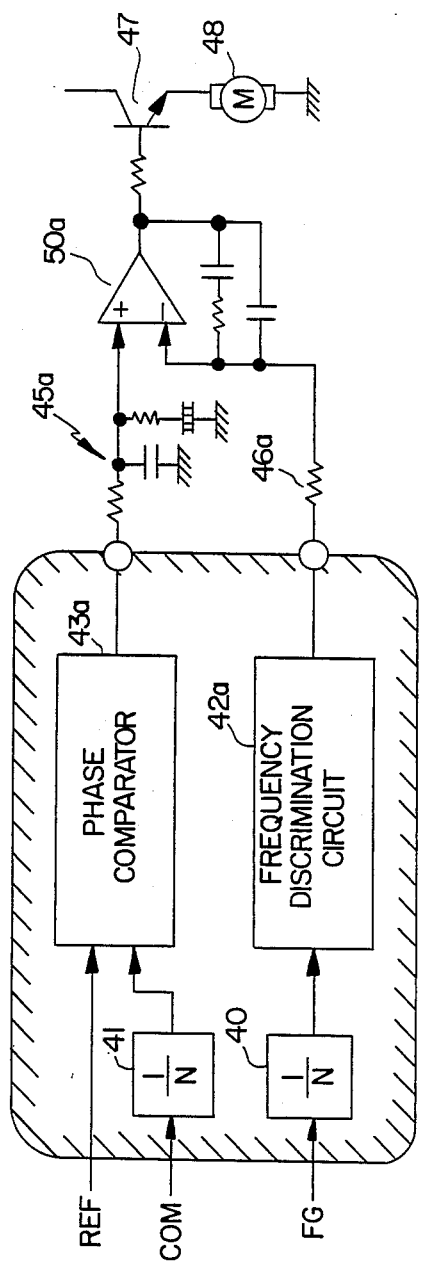
FIG. 17 is a schematic block diagram showing a servo system for a capstan motor in VTRs comprised of the embodiments of the digital frequency discrimination circuit and phase comparator of FIGS. 8 and 13.

FIG. 17 shows an example of a VTR capstan servo system comprised of the embodiments of the digital frequency discriminator and the phase comparator, as shown in FIGS. 8 and 13. The VHS system VTR is subjected to three recording speed modes of SP, LP and EP. Further the VHS system VTR is required to control a capstan motor at a various speed for a fast reproduction mode. In the N times fast reproduction mode, the digital data FG and COM have their frequencies divided by N through dividers 40 and 41 before supplying them to the frequency discriminator 42a and the phase comparator 43a. The outputs of the frequency discriminator 42a and the phase comparator 43a are applied, as the AFC (Automatic Frequency Control) voltage and the APC (Automatic Phase Control) voltage, to a power amplifier 50a via filters 45a and 46a. The output of the power amplifier 50a is applied to a control transistor 47 of a servo motor 48 such as a capstan motor for driving a video tape.

As seen from the drawing, the capstan servo system for VTRs according to the present invention is constructed without any circuit for gain adjustment because the frequency discriminator 42a and the phase comparator 43a have the functions of gain alteration, as described before. It is possible to make into an IC, the portion of the circuit of the capstan servo system for VTRs according to the present invention shown by the diagonal shading shown in FIG. 17. Therefore, the IC requires only two pins for the connections to external circuits.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A digital servo system for a motor driven apparatus comprising:
   source means of a clock signal;
   counter means for counting the clock signal applied from the clock signal source means;
   latch means which latches predetermined lower bits of the output of the counter means;
   means for obtaining a servo control output in response to the latch means;
   control means which is supplied with a digital data which is processed, and controls passing of the clock signal to the counter means in response to the digital data and outputs a latch pulse for the latch device;
   gate means responsive to the control means for stopping the input of the clock signal to the counter means by controlling the counter means when the digital data is supplied to the control means;
   means responsive to the control means for latching a most significant bit of the predetermined lower bits;
   means responsive to the control means for shifting specified bits of the count data of the counter means; and
   means for identifying the upper limit and lower limit of the said servo control output and the linear range between them using the output of the said most significant bit latch means and the shifted specified bit output of the counter means.

2. A digital servo system of claim 1 wherein the system further comprises:
   first means for detecting the all "1" of the shifted specified bits when the most significant bit is "0";
   second means for detecting the all "0" of the shifted specified bits when the most significant bit is "1"; and
   means for obtaining a logic sum between the outputs of the first and second means.

3. A digital servo system of claim 1 wheren the latch means obtains a frequency discrimination output of the digital data, and the control means generates a preset pulse after the counter means has been shifted.

4. A digital servo system of claim 1 wherein the counter means is reset by a reference signal and the latch means obtains a phase comparison output between the digital data and the reference signal, and the control means generates a preset pulse after the counter means has been shifted.

* * * * *